(12) United States Patent
Iwasaki

(10) Patent No.: US 7,710,661 B2
(45) Date of Patent: May 4, 2010

(54) OPTICAL APPARATUS

(75) Inventor: Youichi Iwasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/335,670

(22) Filed: Dec. 16, 2008

(65) Prior Publication Data

US 2009/0161232 A1 Jun. 25, 2009

(30) Foreign Application Priority Data

Dec. 19, 2007 (JP) .............................. 2007-328062

(51) Int. Cl.
*G02B 15/14* (2006.01)
(52) U.S. Cl. .................. 359/697; 359/676; 359/694
(58) Field of Classification Search ......... 359/696–698, 359/694, 676
See application file for complete search history.

(56) References Cited

U.S. PATENT DOCUMENTS

| | | | |
|---|---|---|---|
| 5,895,129 A | 4/1999 | Ohta | |
| 2005/0157180 A1* | 7/2005 | Takahashi et al. | 348/207.99 |
| 2008/0152334 A1* | 6/2008 | Choi et al. | 396/97 |

FOREIGN PATENT DOCUMENTS

JP 3581513 A 8/1998

* cited by examiner

*Primary Examiner*—Scott J Sugarman
*Assistant Examiner*—Dawayne A Pinkney
(74) *Attorney, Agent, or Firm*—Canon U.S.A., Inc.; I.P. Division

(57) ABSTRACT

An optical apparatus includes a magnification-varying lens, a controller configured to control an actuator, and to move the magnification-varying lens; and a temperature detector configured to detect a temperature of the optical apparatus, wherein the controller sets a telephoto end position of the magnification-varying lens to a first position when the temperature detected by the temperature detector is a first temperature, and the controller sets the telephoto end position of the magnification-varying lens to a second position closer to a wide-angle side than the first position when the temperature detected by the temperature detector is a second temperature higher than the first temperature.

4 Claims, 10 Drawing Sheets

OPTICAL APPARATUS

BACKGROUND OF THE INVENTION

Field of the Invention

The present invention relates to an optical apparatus, such as a digital still camera, a video camera, and an interchangeable lens, which can vary a magnification by moving a magnification-varying lens.

The above optical apparatus provides focus control and magnification variation by moving a movable lens, such as a focus lens and a magnification-varying lens (variator), through an actuator, such as a stepping motor.

In general, in driving a movable lens using a pulse drive actuator, such as a stepping motor, the open loop control system is often used for a driving control method of the movable lens. The open loop control system can obtain information on a moving amount or position of the movable lens by counting the number of pulses in a driving pulse signal provided to an actuator from a state where the movable lens is located at a reference (or reset) position. Use of the open loop control system dispenses with a detector that continuously detects the position of the movable lens that is moving, and makes a structure of a control system simpler and smaller than the closed loop control system.

FIG. 8 shows two curves, each of which indicates a relationship in the magnification variation between a position of a variator (abscissa axis) and a position of a focus lens (ordinate axis) so as to maintain an on-focus state on a subject that is located at the cloest end or the infinite end. These curves each will be referred to as a cam locus hereinafter.

On the abscissa axis in FIG. 8, "Wide" and "Tele" denote a wide-angle end position and a telephoto end position, to which the variator can be moved under control of a variator actuator. In addition, "Closest" and "Infinite" on the ordinate axis denote the closest end position and the infinite position, to which the focus lens can be moved under control of a focus lens actuator. These wide-angle end position, telephoto end position, closest end position, and infinite end position are ends of the controllably movable ranges for the variator and the focus lens, and there are mechanical ends of mechanical movable ranges outside of the ends of the controllably movable ranges.

When the subject distance is infinite, the cam locus (focus lens position) smoothly changes to the closest side when the variator's position (referred to as a "zoom position" hereinafter) changes from the wide-angle end position to a middle position. When the zoom position changes from the middle position to the telephoto end position, the cam locus greatly changes to the infinite side. This is similar when the subject distance is closest (e.g., 1,000 mm).

Thus, the cam locus generally traces a significantly steep slope when the zoom position moves from the middle position to the telephoto end position. The slope becomes steepest when the zoom position moves from the vicinity of the telephoto end position to the telephoto end position, and the subject distance is infinite. Assume that $[dy/dx]$ expresses the cam locus gradient at this time. A large value of $[dy/dx]$ means that the focus shifts unless the focus lens is greatly moved to the variator's movement.

Meanwhile, in a lens barrel of the optical apparatus, a structure member, such as a lens holding frame that holds a lens, and a support member that movably or fixedly supports the lens holder frame, is often made of a plastic material.

The plastic material greatly varies its size to temperature changes. Therefore, the lens barrel that uses the plastic material causes the focus shift, even when the variator and the focus lens are moved to positions that follow the cam locus by the open loop control system, because the focal length changes due to the stretches and retractions of the lens and the support member due to temperature changes.

Japanese Patent No. 3,581,513 discloses an optical apparatus that reduces the focus shift along with the temperature change by correcting the cam locus or the position of the focus lens based on temperature information of the optical apparatus.

As a high optical magnification of the optical apparatus and a miniaturization of the lens barrel proceed, the gradient $[dy/dx]$ becomes steeper near the telephoto end position on the cam locus.

More specifically, for example, when the optical magnification is about 20 to 35 times, the gradient $[dy/dx]$ is about −10 to −12, whereas when the optical magnification becomes about 40 times, the gradient $[dy/dx]$ increases up to about −13 to −30.

In the latter case, in the optical apparatus that controls the positions of the variator and the focus lens based on the cam locus, when the telephoto end position of the variator shifts even slightly due to the stretch or retraction of the structure member caused by the temperature change, the focus lens needs to be moved by about 30 times as large as the shift amount.

FIG. 7 shows a conventional zoom lens barrel having a magnification-varying optical system of a convex, concave, convex, and convex structure. L1 is a front lens, L2 is a variator, L3 is a fixed lens, and L4 is a focus lens. The variator L2 is controlled to stay at the telephoto end position, and the focus lens L2 is controlled to stay at the infinite position.

Assume that a distance between the front lens L1 and the variator L2 is set to 20 mm in this state, and the temperature is increased from 20° C. to 50° C. by 30° C., and a coefficient of linear expansion of the (plastic) structure member of the lens barrel is $7\times10^{-5}$ (=0.00007). Then, a distance (L1-L2) between the front lens L1 and the variator L2 changes as follows:

$L1\text{-}L2 = 20$ mm (at 20° C.)

$L1\text{-}L2 = 20$ mm+(20×30×0.00007) mm=20.042 mm (at 50° C.)

In other words, as the temperature rises, a distance between the front lens L1 and the variator L2 (L1-L2) extends by 0.042 mm.

When the gradient $[dy/dx]$ of the cam locus near the telephoto end is −30 and the variator is moved by 0.042 mm in the ultra telephoto direction, the on-focus state cannot be maintained unless the focus lens L4 is moved to the image surface side by 1.26 mm that is 30 times as large as 0.042 mm. This means that large clearances 45' and 46' greater than 1.26 mm are necessary between a lens holder frame K configured to hold the focus lens L4, and a fixture tube C arranged closer to the image surface side than the lens holder frame K, from the focus lens position at the telephoto end and the infinite end at the normal temperature to the image surface side. This configuration requires a large mechanical overall length of the lens barrel, and prevents the miniaturization of the optical apparatus.

SUMMARY OF THE INVENTION

The present invention is directed to an optical apparatus that can reduce a focus shift caused by the temperature rise without increasing the overall length of the lens barrel.

An optical apparatus includes a magnification-varying lens, a controller configured to control an actuator, and to move the magnification-varying lens, and a temperature detector configured to detect a temperature of the optical apparatus, wherein the controller sets a telephoto end position of the magnification-varying lens to a first position when the temperature detected by the temperature detector is a first temperature, and the controller sets the telephoto end position of the magnification-varying lens to a second position closer to a wide-angle side than the first position when the temperature detected by the temperature detector is a second temperature higher than the first temperature.

Further features of the present invention will become apparent from the following description of exemplary embodiments (with reference to the attached drawings).

DESCRIPTION OF THE EMBODIMENTS

Figure 1A:
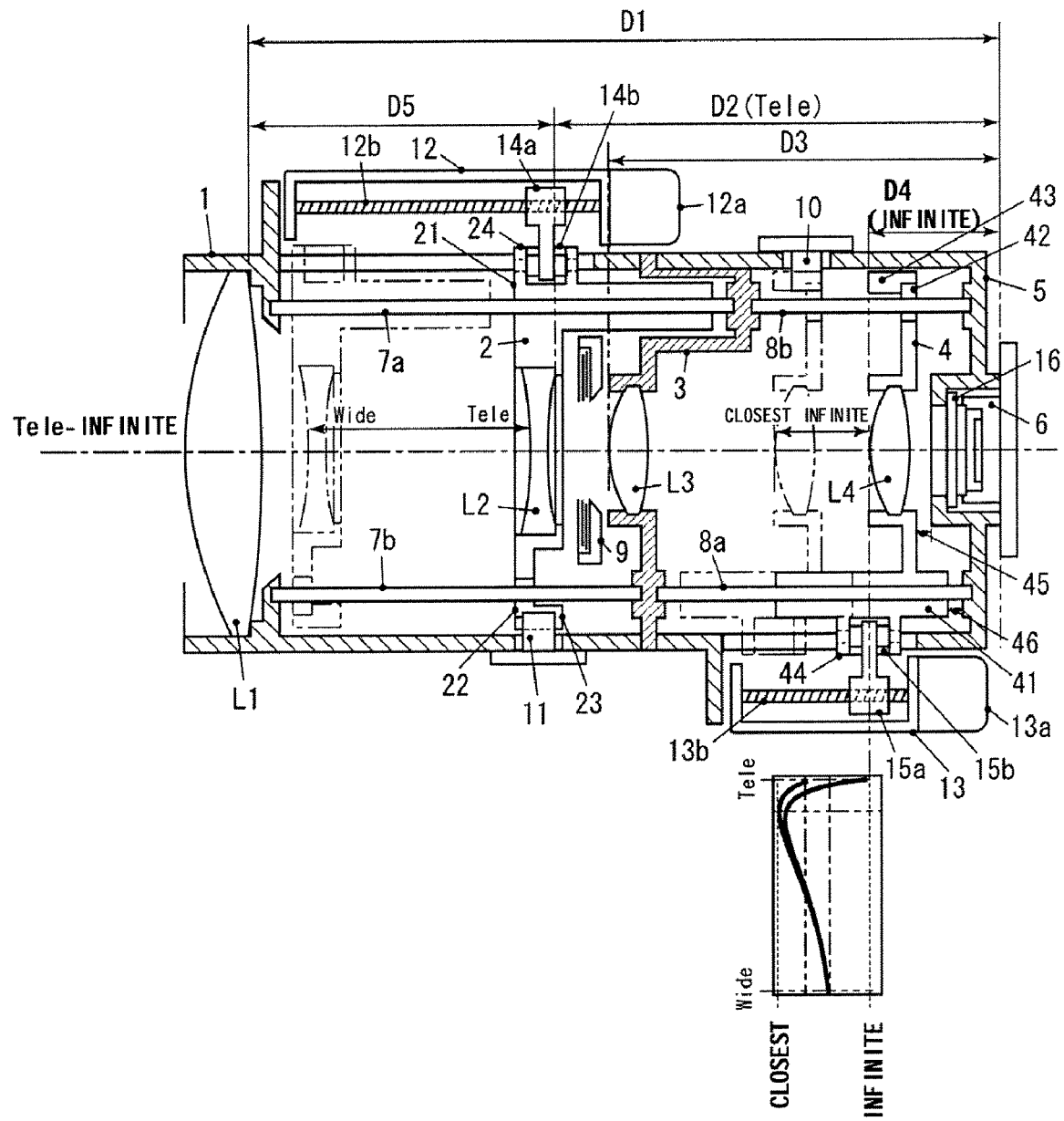
FIG. 1A is a sectional view showing a configuration at the telephoto end and the infinite end state in a video camera according to one embodiment of the present invention.

Referring now to the drawings, a description will be given of an embodiment of the present invention.

Figure 1B:
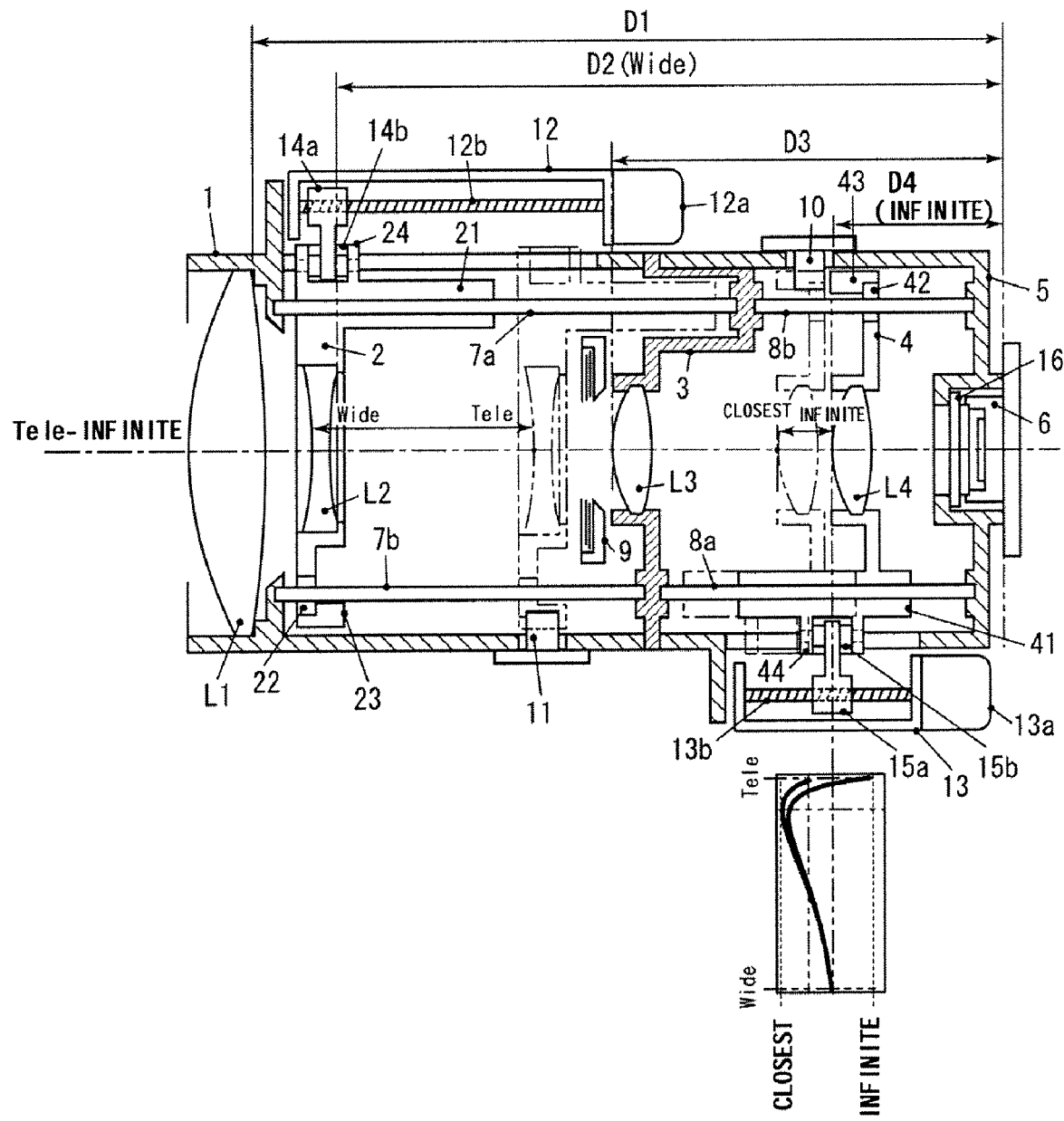
FIG. 1B is a sectional view showing a configuration at the wide-angle end and the infinite end state in the video camera according to the embodiment of the present invention.
Figure 1C:
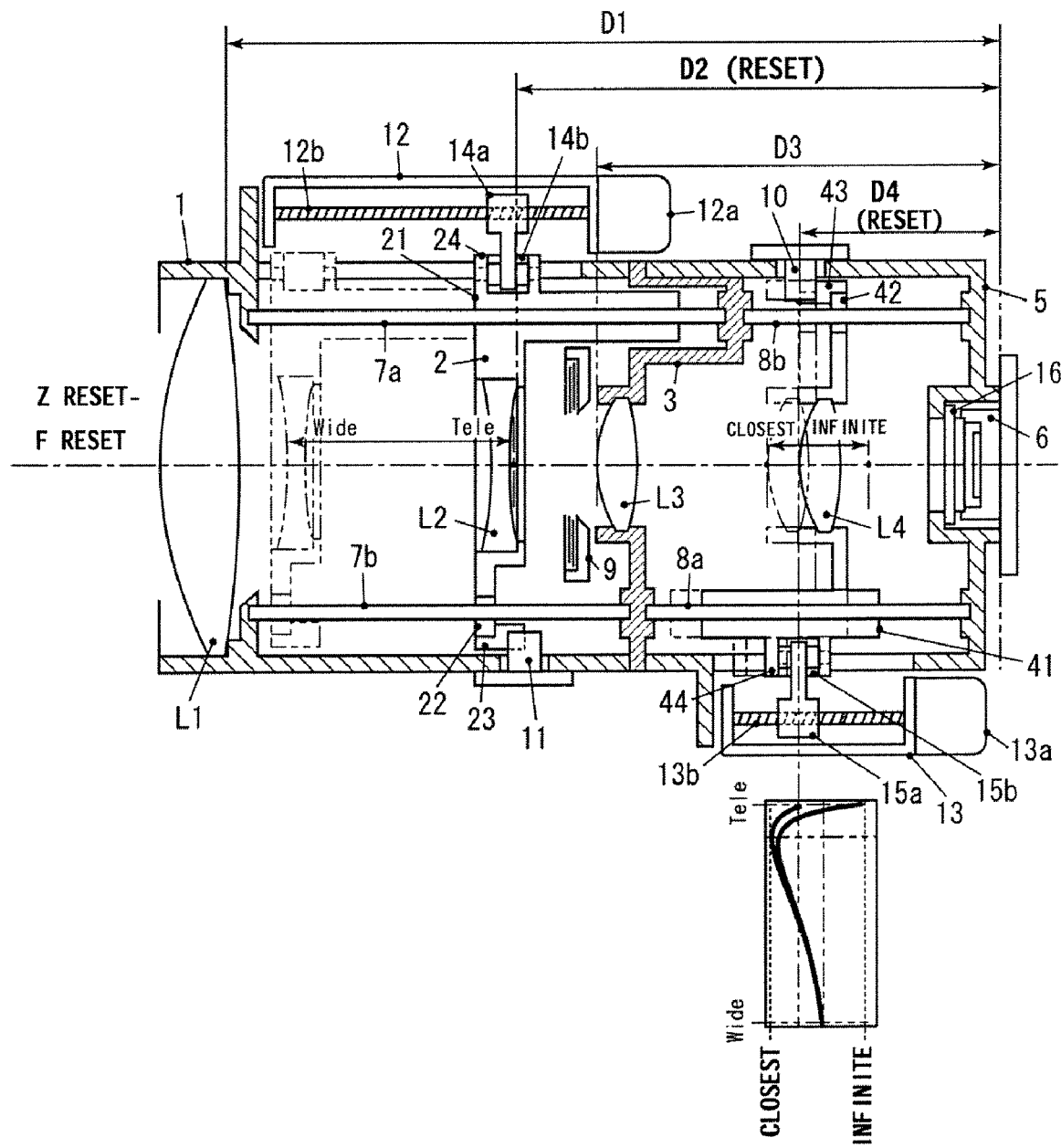
FIG. 1C is a sectional view showing a configuration of a reset state in the video camera according to the embodiment of the present invention.

FIGS. 1A-1C show configurations of a video camera (image pickup apparatus) as an optical apparatus according to one embodiment of the present invention.

FIG. 1A shows a state in which a zoom position is located at a telephoto end position and a focus position is located at an infinite end position. FIG. 1B shows a state in which a zoom position is located at a wide-angle end position and a focus position is located at an infinite end position. FIG. 1C shows a state in which the zoom position and the focus position are reset positions.

In these figures, in order from an object side to an image surface side, L1 denotes a stationary first lens unit, L2 denotes a second lens unit (a variator as a magnification-varying lens) configured to move in the optical-axis direction and provide a magnification variation. L3 denotes a stationary third lens unit. L4 denotes a fourth lens unit (focus lens) configured to move in the optical-axis direction and provide focus control. The first lens unit L1 is a positive (convex) lens unit. The second lens unit L2 is a negative (concave) lens unit. The third lens unit L3 is a positive (convex) lens unit, and the fourth lens unit L4 is a positive (convex) lens unit. This embodiment includes a rear focus type magnification-varying optical system in which the fourth lens unit L4 is arranged closer to the image surface side than the second lens unit L2.

1 denotes a first barrel configured to hold the first lens unit L1, and 2 denotes a zoom movement frame configured to hold the second lens unit L2. 3 denotes a third lens barrel configured to hold the third lens unit L3, and 4 denotes a focus movement frame configured to hold the fourth lens unit L4.

The zoom movement frame 2 has a sleeve 21 that extends in the optical-axis direction, and a U-shaped groove part 22. In addition, the zoom movement frame 2 has a light shielding member 23.

The focus movement frame 4 has a sleeve 41 that extends in the optical-axis direction, and the U-shaped groove part 42. In addition, the focus movement frame 4 has a light shielding member 43.

5 denotes an image sensor holder onto which an image sensor unit 6 is fixed. The image sensor unit 6 includes an image sensor, such as a CCD sensor and a CMOS censor, and an optical filter, such as an infrared/low-pass filter.

7a and 7b denote guide bars, both ends of which are held by the first barrel 1 and the third barrel 3. 8a and 8b denote guide bars, both ends of which are held by the third barrel 3 and the image sensor holder 5.

The sleeve 21 of the zoom movement frame 2 is engaged with the guide bar 7a so that the sleeve 21 can move in the optical-axis direction, and thereby the zoom movement frame 2 is guided in the optical-axis direction. The U-shaped groove part 22 of the zoom movement frame 2 is engaged with the guide bar 7b so that the U-shaped groove part 22 can move in the optical-axis direction, and thereby the zoom movement frame 2 is prevented from rotating around the guide bar 7a.

The sleeve 41 of the focus movement frame 4 is engaged with the guide bar 8a so that the sleeve 41 can move in the optical-axis direction, and thereby the focus movement frame 4 is guided in the optical-axis direction. The U-shaped groove part 42 of the focus movement frame 4 is engaged with the guide bar 8b so that the U-shaped groove part 42 can move in the optical-axis direction, and thereby the focus movement frame 4 is prevented from rotating around the guide bar 8a.

9 denotes a stop unit configured to move two stop blades (not shown) in opposite directions in a plane orthogonal to the optical axis, and to change an aperture diameter of the optical system. An ND filter (not shown) is stuck on one of the two stop blades so as to prevent image degradations due to the so-called small stop diffraction.

10 denotes a photo-interrupter, which serves as a reference position detector of the focus movement frame 4. The photo-interrupter 10 has a light projection element and a light receiving element (both of which are not shown). When the light shielding member 43 of the focus movement frame 4 is inserted into a space between the light projection element and the light receiving element, and shields the light that directs from the light projection element to the light receiving element, the CPU, which will be described later, can detect that the focus movement frame 4 is located at a reference position as an absolute position.

11 denotes a photo-interrupter, which serves as a reference position detector of the zoom movement frame 2. The photo-interrupter 11 has a light projection element and a light receiving device (both of which are not shown). When the light shielding member 23 of the zoom movement frame 2 is inserted into a space between the light projection element and the light receiving element, and shields the light that directs from the light projection element to the light receiving element, the CPU can detect that the zoom movement frame 2 is located at a reference position as an absolute position.

12 denotes a zoom motor that includes a stepping motor, and drives the second lens unit L2 in the optical-axis direction. 13 denotes a focus motor that includes a stepping motor, and drives the fourth lens unit L4 in the optical-axis direction. The zoom motor 12 and the focus motor 13 are fixed onto the first barrel 1 and the image sensor holder 5 respectively via screws (not shown).

These motors 12 and 13 have motor bodies 12a and 13a that generate rotational forces, and lead screws 12b and 13b that are rotationally driven by the rotational forces from the motor bodies 12a and 13a.

14a and 15a denote racks, which are attached to rack attachment parts 24 and 44 provided onto the zoom movement frame 2 and the focus movement frame 4. The racks 14a and 15a are engaged with the lead screws 12b and 13b.

14b and 15b denote rack springs, which force the racks 14a and 15a against the rack attachment parts 24 and 44 in the optical-axis direction towards the object side, and remove unsteadiness of the racks 14a and 15a relative to the zoom movement frame 2 and the focus movement frame 4 in the optical-axis direction. The rack springs 14b and 15b force the racks 14a and 15a in a direction promoting their engagements with the lead screws 12b and 13b.

In such a structure, the rotations of the lead screws 12b and 13b are converted by the racks 14a and 15a into motions in the optical-axis direction. Thereby, the zoom movement frame 2 (second lens unit L2) and the focus movement frame 4 (fourth lens unit L4) are driven in the optical-axis direction.

While this embodiment uses a stepping motor for an actuator that drives the zoom movement frame 2 and the focus movement frame 4, another actuator can be used, such as a DC motor, a vibration type motor (rotational type or linear type), and a voice coil motor ("VCM"). In addition, an encoder other than the photo-interrupter may be used to detect positions of the zoom movement frame 2 and the focus movement frame 4.

D1 denotes a distance from an image sensor attachment surface of the image sensor unit 6 to the first lens unit L1. D2 denotes a distance from the image sensor attachment surface to the second lens unit L2 located at the telephoto end position, the wide-angle end position, or the reference position. D3 denotes a distance from the image sensor attachment surface to the third lens unit L3. D4 denotes a distance from the image sensor attachment surface to the fourth lens unit L4 located at the telephoto end position, the wide-angle end position, or the reference position. D5 denotes a distance between the first lens unit L1 and the second lens unit L2 located at the telephoto end position.

Figure 2:
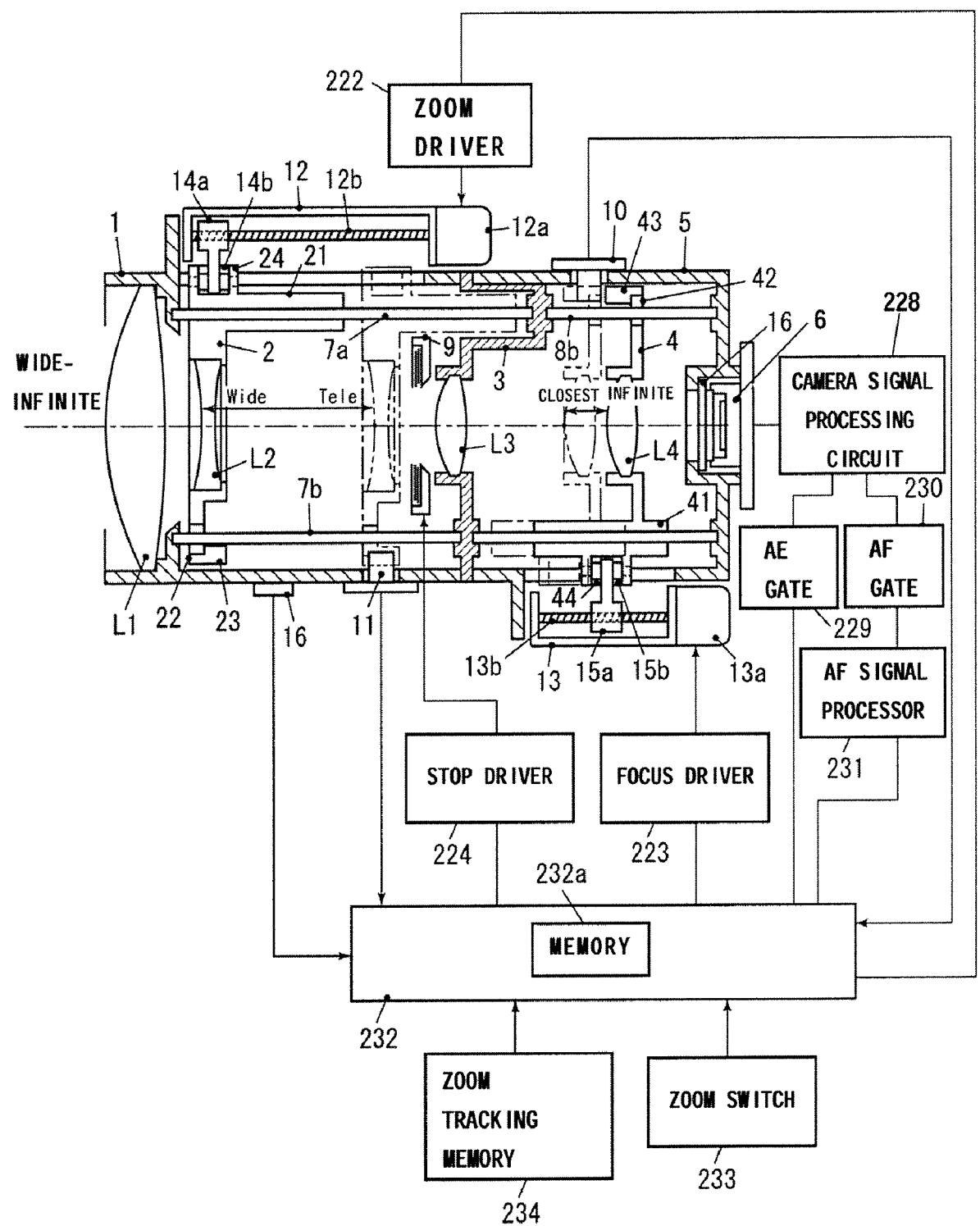
FIG. 2 is a sectional view and a block diagram of an electric structure of the video camera according to an embodiment of the present invention.

FIG. 2 shows an electric structure of the video camera according to this embodiment. 232 denotes a CPU as a controller, which governs the entire video camera. 222 is a zoom driver, which rotates the zoom motor 12 according to a signal from the CPU 232. 223 is a focus driver, which rotates the focus motor 13 according to a signal from the CPU 232.

The CPU 232 executes the following lens's initial position setting when a power switch (not shown) of the video camera is turned on. Initially, the CPU 232 rotates the zoom and focus motors 12 and 13 via the zoom and focus drivers 222 and 223, and moves the zoom and focus movement frames 2 and 4 towards the photo-interrupters 11 and 10. When each of the light shielding members 23 and 24 is inserted into the space between the light projection element and the light-receiving element of each of the photo-interrupter 11 and 10, and cuts off a signal from each light-receiving element, the zoom and focus movement frames 2 and 4 are detected to be driven to the reference (reset) positions.

Thereafter, the CPU 232 rotates the zoom and focus motors 12 and 13, and moves the zoom and focus movement frames 2 and 4 to the initial zoom position (telephoto end position) and the initial focus position (closest end position) respectively set in the image surface direction and the object direction. A moving amount from the reference position to the initial zoom position or initial focus position is previously stored in the memory 232a in the CPU 232, which is expressed as the number of pulses of the driving pulse signals provided to the zoom and focus motors 12 and 13. A time period from when the above lens's initial position setting starts (or the power switch turns on) to when this action is completed will be referred to as a lens's initial position setting time period.

The lenses' initial positions settings of the zoom movement frame 2 and the focus movement frame 4 may be performed in parallel or one action may be prior to the other action.

224 denotes a stop driver, which provides opening and closing actions to the stop unit 9 according to the signal from the CPU 232.

228 denotes a camera signal processing circuit, which provides a process, such as amplification and a gamma correction to an output from the image sensor unit 6, and generates a video signal. The video signal is sent to and displayed on a display device (not shown). The video signal is sent to the automatic exposure ("AE") gate 229 and an autofocus ("AF") gate 230.

The AE gate 229 extracts, from the video signal, a brightness component of a photometry area selected among the entire image by a user or the CPU 232, and sends the brightness component to the CPU 232. The CPU 232 controls an aperture diameter of the stop unit 9 and a process parameter in the camera signal processing circuit 228 based on the brightness component, and generates a video signal having a proper brightness.

The AF gate 230 extracts a high frequency component of the AF area selected among the entire image by the user or the CPU 232, and sends the high frequency component to the AF signal processing circuit 231.

The AF signal processing circuit 231 generates an AF evaluation value signal from the high frequency component from the AF gate 230, and sends the AF evaluation value signal to the CPU 232. The CPU 232 moves the fourth lens unit L4 via the focus driver 223 and the focus motor 13 so that the AF evaluation value signal can search the on-focus position as a peak, thereby providing the AF.

233 denotes a zoom switch as a zoom operation member, which outputs a zoom command signal configured to instruct a zoom (magnification variation) to the telephoto side or the wide-angle side according to the user's operation.

234 is a zoom tracking memory, which stores zoom tracking data (cam locus data) to maintain the on-focus state in the magnification variation. The zoom tracking data is data indicative of the position of the fourth lens unit L4 according to a subject distance and the position of the second lens unit L2.

For example, when the zoom switch 233 is manipulated, the CPU 232 moves the second lens unit L2 via the zoom driver 222 and the zoom motor 12. At this time, the CPU 232 moves the fourth lens unit L4 via the focus driver 223 and the focus motor 13 so as to maintain a positional relationship of the second lens unit L2 and the fourth lens unit L4, which positional relationship is calculated based on the zoom tracking data.

The CPU 232 counts the number of pulses of the driving pulse signal given to the zoom and focus motors 12 and 13 from when the second and fourth lens units L2 and L4 are moved to the above reference positions. Thereby, the CPU 232 can detect the (zoom) position of the second lens unit L2 and the (focus) position of the fourth lens unit L4. The CPU 232 controls the movements of the second and fourth lens units L2 and L4 (rotations of the motors 12 and 13) so that the detected zoom and focus positions can trace the zoom tracking data. Thereby, the on-focus state can be maintained in the magnification variation.

16 denotes a temperature sensor or detector, such as a thermostat, and the output is always taken in the CPU 232. Thereby, the CPU 232 can detect the temperature of the video camera (the lens barrel part that includes the first barrel 1 and the image sensor holder 5).

Figure 3:
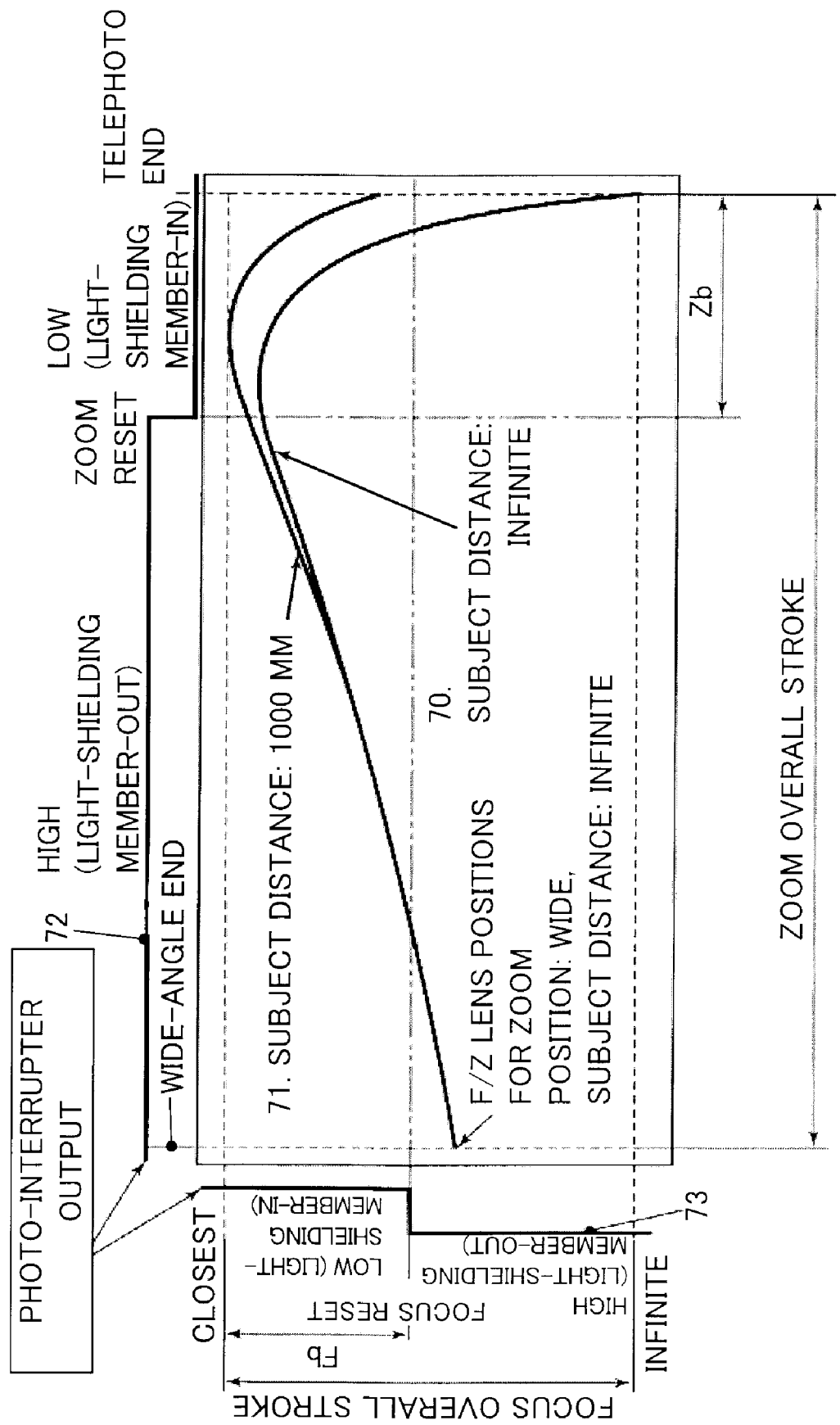
FIG. 3 is a view showing a relationship between a zoom position and a focus position in the video camera according to the embodiment.

FIG. 3 shows the zoom tracking data (cam locus) used to control the (Z lens) position of the zoom movement frame 2 and the (F lens) position of the focus movement frame 4. The abscissa axis denotes a Z lens position from the wide-angle end position to the telephoto end position, and the ordinate axis denotes a F lens position from the infinite end position to the closest end position.

A curve 70 shows the Z lens position and the F lens position when the subject distance is infinite. A curve 71 shows the Z lens position and the F lens position when the subject distance is closest (e.g., 1,000 mm).

72 denotes an output of the photo-interrupter 11 that switches when the light shielding member 23 of the zoom movement frame 2 proceeds in and retreats out of the space between the light projection element and the light receiving element of the photo-interrupter 11. 73 denotes an output of the photo-interrupter 10 that switches when the light shielding member 43 of the focus movement frame 4 proceeds in and retreats out of the space between the light projection element and the light receiving element of the photo-interrupter 10. The switching position (zoom reset or focus reset) from High to Low of each photo-interrupter is a reference position of the pulse count to detect the position (moving amount) of the Z lens position and the F lens position.

In FIG. 3, the "wide-angle end" and the "telephoto end" on the abscissa axis are the wide-angle end position and the telephoto end position, to which the second lens unit L2 can be moved under control of the zoom motor 12. The "closest" and "infinite" on the ordinate axis are the closest end position and the infinite end position, to which the fourth lens unit L4 can be moved under control of the focus motor 13. These wide-angle end position, telephoto end position, closest end position, and infinite end position (shown by a dotted line) are ends of controllably movable ranges of the second and fourth lens units L2 and L4. There are (mechanical) ends of the mechanically movable ranges shown by solid lines outside of the ends of the controllably movable ranges.

Zb is a predetermined moving amount of the second lens unit L2 from the zoom reset to the telephoto end position. Fb is a predetermined moving amount of the fourth lens unit L4 from the focus reset to the closest end position. These predetermined moving amounts Zb and Fb are stored in the memory 232a in the CPU 232, which are expressed as the number of pulses of the driving pulse signals given to the zoom motor 12 and the focus motor 13.

Figure 4:
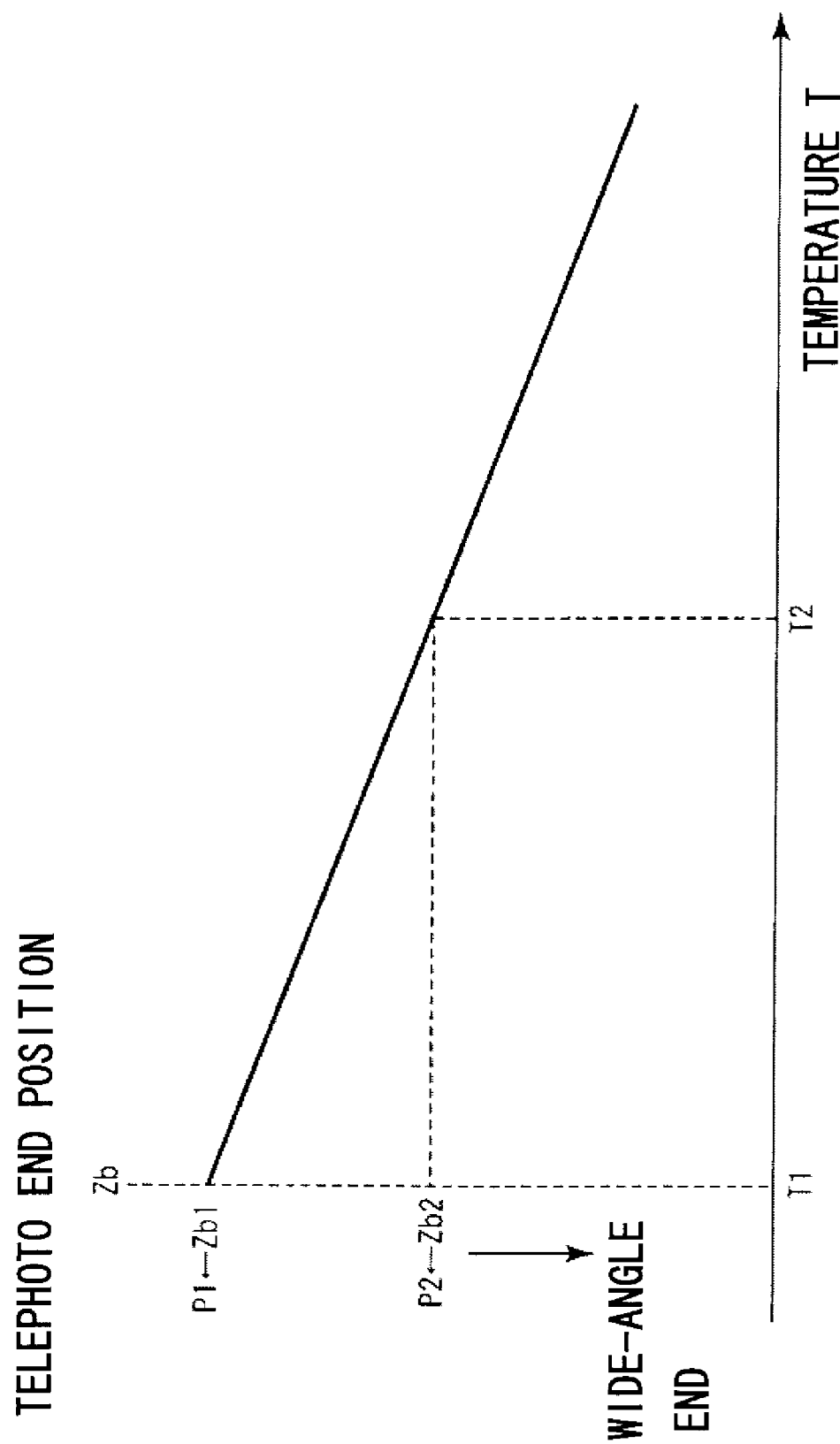
FIG. 4 is a view showing a relationship between the temperature and a predetermined movement amount (telephoto end position) in the video camera according to the embodiment.

FIG. 4 is a data table of the predetermined moving amount Zb stored in the memory 232a. The abscissa axis is a temperature T of the video camera (lens barrel part) detected by the temperature sensor 16. The ordinate axis is a predetermined moving amount Zb that changes relative to the detected temperature.

As understood from this figure, when the detected temperature T is a first temperature (normal temperature such as 20° C.) T1, the predetermined moving amount Zb is set to a first moving amount Zb1. Thereby, when the detected temperature T is the first temperature T1, the telephoto end position for control of the second lens unit L2 is set to the first position P1. When the detected temperature T is a second temperature T2 higher than the first temperature T1, the predetermined moving amount Zb is set to a second moving amount Zb2 smaller than the first moving amount Zb1. Thereby, when the detected temperature T is the second temperature T2, the telephoto end position for control of the second lens unit L2 is set to the second position P2 closer to the wide-angle side than the first position P1.

In other words, this embodiment sets the telephoto end position for control of the lens unit L2 to a position closer to the wide-angle side (or makes the predetermined moving amount Zb smaller) as a difference between the second temperature T2 and the first temperature T1 as a reference temperature increases. Therefore, when the second temperature T2 is higher than the first temperature T1, the telephoto end position for control is changed in a zoom range that is closer to the side-angle side than the telephoto end position that is set for the first temperature.

While FIG. 4 shows that the predetermined moving amount Zb linearly changes to the detected temperature T, the predetermined moving amount Zb may change like a curve to the detected temperature T.

Figure 5:
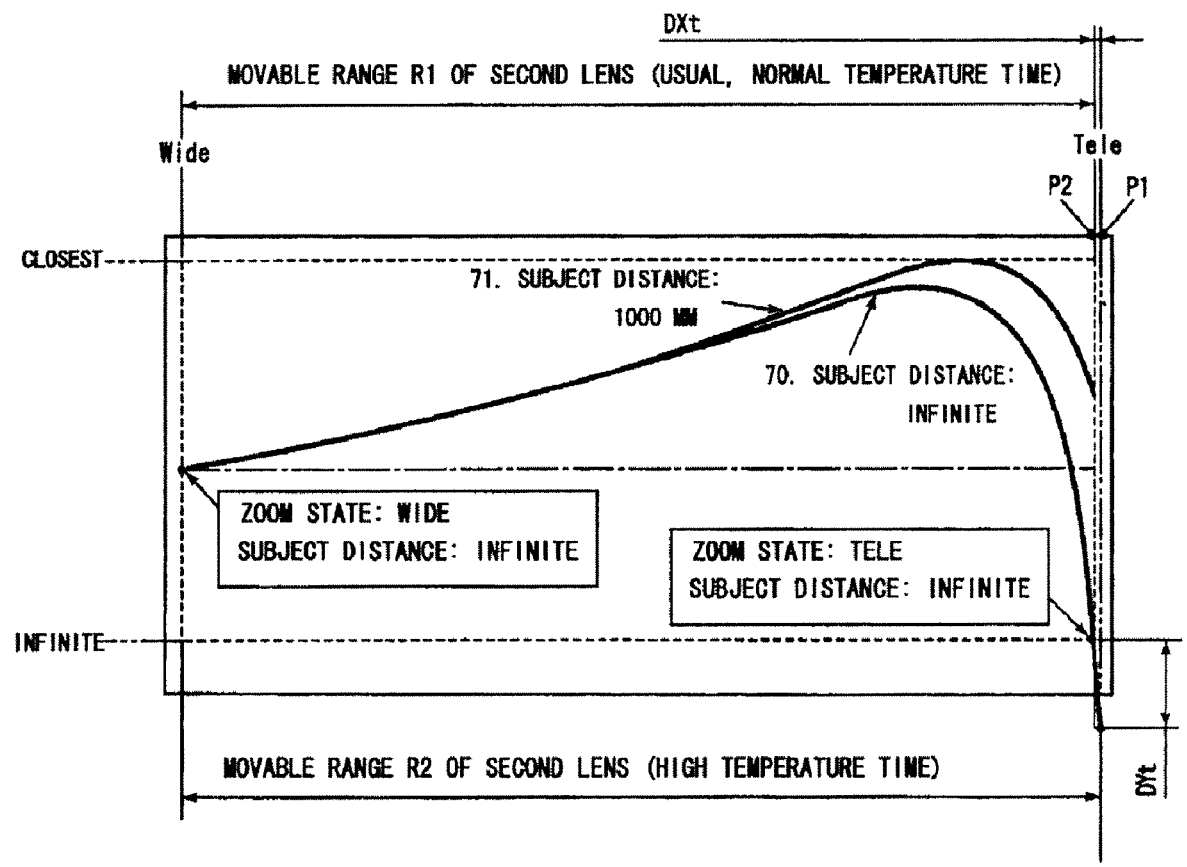
FIG. 5 is a view showing a change of the telephoto end position in the video camera according to the embodiment.

Assume that the temperature rise (high temperature state) occurs in a temperature range higher than the first temperature T1 after the above lens's initial position setting. Then, the position of the second lens unit L2 (zoom movement frame 2) at the telescopic end and the infinite end to the image pickup surface shifts, as shown in FIG. 5, by DXt due to the thermal expansions of the components of the lens barrel part, such as the first barrel 1, the third barrel 3, the image sensor holder 5, and the movement frames 2 and 4. Thereby, the focal length of the magnification-varying optical system at the telephoto end becomes longer than the (original) focal length of the telephoto end at the first temperature T1. As a result, the focus position shifts by DYt.

This focus shift can be corrected by moving the fourth lens unit L4 as a focus lens to the infinite side (image surface side) by DYt. However, this configuration requires a clearance greater than DYt between the focus movement frame 4 and the image sensor holder 5 that is closer to the image surface side than the focus movement frame 4. As a result, disadvantageously, the overall length of the lens barrel part becomes longer, or the lens barrel part cannot possess the clearance greater than DYt.

Therefore, this embodiment corrects the focus shift DYt by moving the second lens unit L2 to the widen-angle side by DXt instead of moving the lens unit L4. In other words, the focal length at the telephoto end which has become longer due to the temperature rise is returned to the original focal length. More specifically, the telephoto end position of the second lens unit L2 is changed from the first position P1 to the second position P2 that is closer to the wide side than the first position P1, by changing the predetermined moving amount Zb from the reference position of the above second lens unit L2 from the first moving amount Zb1 to the second moving amount Zb2. As a result, a movable range R2 for control of the second lens unit L2 from the wide-angle end position to the telephoto end potion at the second temperature T2 becomes narrower than a movable range R1 for control of the second lens unit L2 from the wide-angle end position to the telephoto end position at the first temperature T1. However, the focal length of the magnification-varying optical system at the telephoto end position does not change between the first temperature T1 and the second temperature T2.

Thus, clearances 45, 46 between the focus movement frame 4 and the image sensor holder 5 can be made equal to or smaller than DYt by correcting the focus shift caused by the temperature rise, without moving the fourth lens unit L4. Therefore, the overall length of the lens barrel part can be made small.

Figure 6:
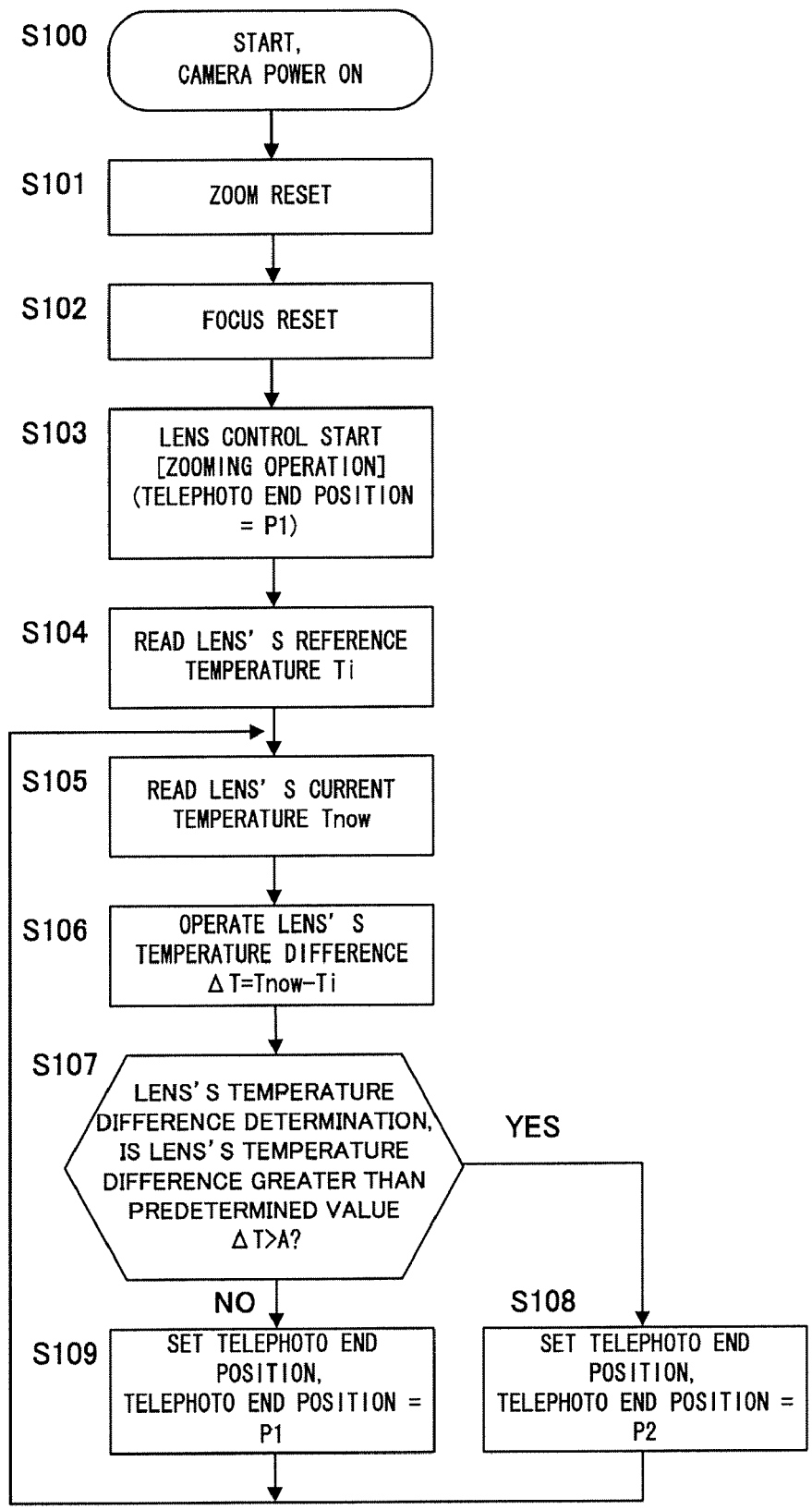
FIG. 6 is a flowchart of an operation in the video camera according to the embodiment.
Figure 7:
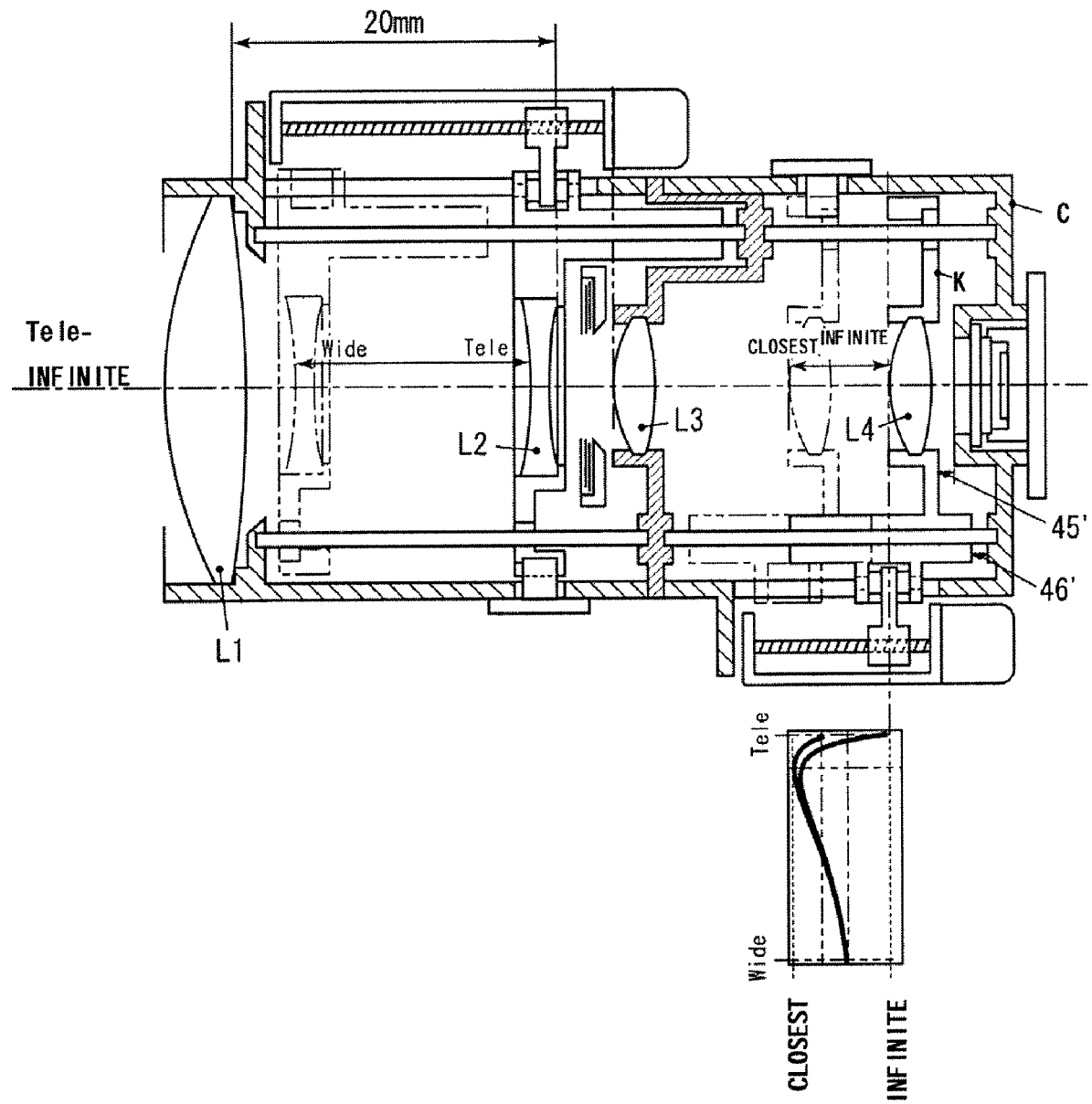
FIG. 7 is a sectional view showing a configuration of a telephoto end and infinite end state in a conventional video camera.
Figure 8:
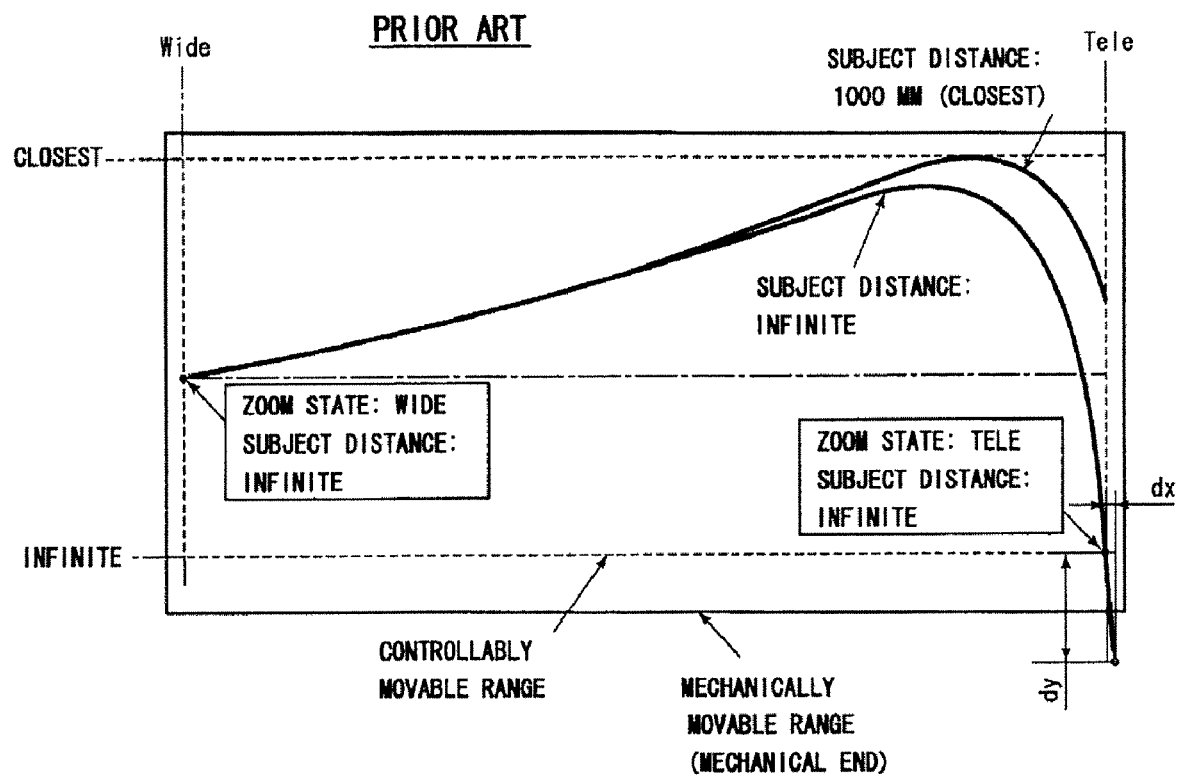
FIG. 8 is a view showing a relationship between a zoom position and a focus position in the conventional video camera.

FIG. 6 shows a flowchart of an operation of the CPU 232. This operation is pursuant to a computer program installed in the CPU 232. In this figure, "S" means the step.

When the power switch is turned on, the CPU 232 is activated (S100). Next, the CPU 232 provides the lens's initial position setting of the zoom movement frame 2 (S101).

Next, the CPU 232 provides the lens's initial position setting of the focus movement frame 4 (S102). The lens's initial position setting of the focus movement frame 4 may be performed prior to the lens's initial position setting of the frame movement frame 2.

When the lens's initial position setting of each movement frame ends, the CPU 232 starts a usual lens control action. For example, when the zoom switch 233 is operated, the CPU 232 controls the zoom and focus motors 12 and 13 so as to move the zoom movement frame 2 and the focus movement frame 4 according to the zoom tracking data (S103).

Next, the CPU 232 reads a reference temperature Ti that is previously stored in the memory 232a (S104). This reference temperature Ti corresponds to the above first temperature T1.

In addition, the CPU 232 detects the current temperature Tnow through the temperature sensor 16, and stores it in the memory 232 (S105). The temperature Tnow corresponds to the above second temperature T2.

The CPU 232 in S106 operates a difference $\Delta T$ (=Tnow−Ti) between the temperature Ti and the current temperature Tnow. Next, the CPU 232 determines whether the temperature difference $\Delta T$ is greater than a predetermined value A (S107). When the temperature difference $\Delta T$ is greater than the predetermined value A, the flow proceeds to S108, and when the temperature difference is equal to or smaller than the predetermined value the flow proceeds to S109.

The CPU 232 in S108 reads the predetermined moving amount Zb (second moving amount Zb2) corresponding to the current temperature Tnow from the table data shown in FIG. 4 stored in the memory 232a. Then, the CPU 232 changes from the first moving amount Zb1 to the second moving amount Zb2 the predetermined moving amount Zb for control from the reference position to the telephoto end.

When the zoom movement frame 2 (second lens unit L2) is located at the telephoto end position P1, the CPU 232 controls the zoom motor 12 so as to move the zoom movement frame 2 to the wide-angle side by a difference DXt between the first moving amount Zb1 and the second mobbing amount Zb2.

On the other hand, the CPU 232 in S109 sets the predetermined moving amount Zb for control from the reference position to the telephoto end position to the first moving amount Zb1.

The flow returns to S105 from S108 or S109.

While this embodiment discusses the video camera, the present invention is applicable to another optical apparatus, such as a digital still camera and an interchangeable lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-328062, filed on Dec. 19, 2007, which is hereby incorporated by reference herein in its entirety.

What is claimed is:

1. An optical apparatus comprising:
   in order from an object side toward an image side, a first lens unit configured to be fixed when performing a magnification variation, a second lens unit configured to perform a magnification variation by moving in an optical axis direction, a third lens unit configured to be fixed when performing a magnification variation, a fourth lens unit configured to perform a focus control by moving in the optical axis direction;
   a controller configured to control an actuator, and to thereby move the second lens unit; and
   a temperature detector configured to detect a temperature of the optical apparatus,
   wherein the controller, without changing a telephoto end position of the fourth lens unit even when the temperature detected by the temperature detector changes, sets a telephoto end position of the second lens unit to a first position when the temperature detected by the temperature detector is a first temperature, and the controller sets the telephoto end position of the second lens unit to a second position closer to a wide-angle side than the first position when the temperature detected by the temperature detector is a second temperature higher than the first temperature.

2. An optical apparatus according to claim 1, wherein the controller sets the second position to a position closer to the wide-angle side as a difference between the second temperature and the first temperature increases.

3. An optical apparatus according to claim 1, wherein the controller moves the second lens unit so that the telephoto end position of the second lens unit can be a position that is apart from a reference position by a predetermined moving amount closer to a telephoto side, and
   wherein the controller sets the predetermined moving amount to a first moving amount when the temperature detected by the temperature detector is the first temperature, and the controller sets the predetermined moving amount to a second moving amount smaller than the first moving amount when the temperature detected by the temperature detector is the second temperature.

4. An optical apparatus according to claim 3, wherein the controller sets the second moving amount to a smaller value as a difference between the second temperature and the first temperature increases.

* * * * *